United States Patent [19]

Horsma et al.

[11] Patent Number: 4,560,498

[45] Date of Patent: Dec. 24, 1985

[54] POSITIVE TEMPERATURE COEFFICIENT OF RESISTANCE COMPOSITIONS

[75] Inventors: David A. Horsma, Palo Alto; Teddy J. Hammack, Los Altos, both of Calif.

[73] Assignee: Raychem Corporation, Menlo Park, Calif.

[21] Appl. No.: 84,352

[22] Filed: Oct. 12, 1979

Related U.S. Application Data

[63] Continuation of Ser. No. 601,639, Aug. 4, 1975, which is a continuation of Ser. No. 510,035, Sep. 27, 1974.

[51] Int. Cl.$^4$ .............................................. H01B 1/06
[52] U.S. Cl. ................................... 252/511; 252/512; 252/518
[58] Field of Search ............... 252/511, 500, 512, 518, 252/502; 260/37 R, 42.32, 42.34, 42.39, 42.41; 524/495, 439, 496, 401; 204/159.2, 159.17; 264/105

[56] References Cited

U.S. PATENT DOCUMENTS

| | | | |
|---|---|---|---|
| 3,037,954 | 2/1963 | Gessler | 260/33.6 |
| 3,042,649 | 7/1962 | Hawkins et al. | 260/41 |
| 3,076,777 | 10/1963 | Zeolla et al. | 260/45.5 |
| 3,113,934 | 12/1963 | Grossman | 260/45.5 |
| 3,243,753 | 3/1966 | Kohler | 252/511 |
| 3,329,649 | 7/1967 | Wei | 260/41 |
| 3,336,254 | 8/1967 | White | 260/41 |
| 3,433,573 | 3/1969 | Holladay et al. | 8/55 |
| 3,470,127 | 9/1969 | Snell et al. | 260/879 A |
| 3,572,722 | 3/1971 | Harrison | 273/218 |
| 3,591,526 | 7/1971 | Kawashima et al. | 252/511 |
| 3,629,154 | 12/1971 | Johnson et al. | 252/511 |
| 3,635,847 | 1/1972 | Evans | 102/105 |
| 3,663,662 | 5/1972 | Golike et al. | 260/897 A |
| 3,673,121 | 6/1972 | Meyer | 252/511 |
| 3,816,397 | 6/1974 | Luh | 260/897 C |
| 3,823,203 | 7/1974 | De La Mare | 260/876 |
| 3,823,217 | 7/1974 | Kampe | 264/105 |
| 3,827,991 | 8/1974 | Ando | 260/5 |
| 3,832,314 | 8/1974 | Hoh | 260/26 |
| 3,832,423 | 8/1974 | Milkovich et al. | 260/880 |
| 3,836,482 | 9/1974 | Ling et al. | 252/511 |
| 3,849,333 | 11/1974 | Lloyd et al. | 252/511 |
| 3,858,144 | 12/1974 | Bedard et al. | 338/22 |
| 3,861,029 | 1/1975 | Smith-Johannsen et al. | 264/346 |
| 3,891,724 | 6/1975 | Yaeda | 260/889 |
| 3,894,117 | 7/1975 | Agouri et al. | 215/200 |

FOREIGN PATENT DOCUMENTS

| | | |
|---|---|---|
| 241108 | 7/1965 | Austria . |
| 726232 | 1/1966 | Canada . |
| 1490164 | 1/1969 | Fed. Rep. of Germany . |
| 2161076 | 6/1972 | Fed. Rep. of Germany . |
| 2103319 | 1/1974 | Fed. Rep. of Germany . |
| 2345303 | 4/1974 | Fed. Rep. of Germany . |
| 2364947 | 7/1974 | Fed. Rep. of Germany . |
| 2146928 | 3/1973 | France . |
| 2200590 | 4/1974 | France . |
| 455276 | 6/1968 | Switzerland . |
| 741738 | 12/1955 | United Kingdom . |
| 931999 | 7/1963 | United Kingdom . |
| 1012863 | 12/1965 | United Kingdom . |
| 1143314 | 2/1969 | United Kingdom . |
| 1294665 | 11/1972 | United Kingdom . |
| 1296254 | 11/1972 | United Kingdom . |
| 1315617 | 5/1973 | United Kingdom . |
| 1365443 | 9/1974 | United Kingdom . |

OTHER PUBLICATIONS

Research Disclosure, No. 136, p. 26, Aug. 1975.

*Primary Examiner*—Josephine L. Barr
*Attorney, Agent, or Firm*—Timothy H. P. Richardson; Herbert G. Burkard

[57] ABSTRACT

Disclosed is a positive temperature coefficient of resistance (PTC) crosslinked polymeric composition comprising a first polymeric material exhibiting high green strength prior to crosslinking and elastomeric behavior subsequent to cross-linking, and a second polymeric material comprising a thermoplastic, both said materials having dispersed therein conductive particles, e.g., carbon black, and further, said composition exhibiting a rise in resistance with increased temperature at temperatures above the melting point of either material.

20 Claims, 14 Drawing Figures

POSITIVE TEMPERATURE COEFFICIENT OF RESISTANCE COMPOSITIONS

This is a continuation, of application Ser. No. 601,639, filed Aug. 4, 1975, which is a continuation in part of application Ser. No. 510,035 filed Sept. 27, 1974.

BACKGROUND OF THE INVENTION

A new approach to electrical heating appliances in recent years has been self-regulating heating systems which utilize materials exhibiting certain types of PTC (positive temperature coefficient) of resistance characteristics. The distinguishing characteristic of the prior art PTC materials is that upon attaining a certain temperature, a substantial rise in resistance occurs. Prior art heaters utilizing PTC materials generally exhibit more or less sharp rises in resistance within a narrow temperature range, but below that temperature range exhibit only relatively small changes in resistance with temperature. The temperature at which the resistance commences to increase sharply is often designated the switching or anomaly temperature ($T_S$) since on reaching that temperature the heater exhibits an anomalous change in resistance and tends to switch off. Unfortunately, such switch-off only occurs at relatively low power densities with prior art PTC elements.

Self-regulating heaters utilizing PTC materials have advantages over conventional heating apparatus in that they generally eliminate the need for thermostats, fuses or in-line electrical resistors.

The most widely used PTC material has been doped barium titanate which has been utilized for self-regulating ceramic heaters employed in such applications as food warming trays and other small portable heating appliances. Although such ceramic PTC materials are in common use for heating applications, their rigidity has severely limited the number of applications for which they can be used. PTC materials comprising electrically conductive polymeric compositions are also known and certain types have been shown to possess the special characteristics described herein-above. However, in the past, use of such polymeric PTC matrials have been relatively limited, primarily due to their low heating capacity. Such materials generally comprise one or more conductive fillers such as carbon black or powdered metal dispersed in a crystalline thermoplastic polymer. PTC compositions prepared from highly crystalline polymers generally exhibit a steep rise in resistance commencing a few degrees below their crystalline melting point similar to the behavior of their ceramic counterparts at the Curie temperature (the $T_S$ for ceramics). PTC compositions derived from polymers and copolymers of lower crystallinity, for example, a crystallinity of less than about 50%, exhibit a somewhat less steep increase in resistance which commences at a less well defined temperature range often considerably below the crystalline melting point. In the extreme case some polymers of low crystallinity yield resistance temperature curves which are more or less concave upwards with no defineable inflection point. Other types of thermoplastic polymers yield resistance temperature curves which increase fairly smoothly and more or less steeply but continuously with temperature. FIG. I illustrates characteristic curves for the aforementioned different types of PTC compositions. In FIG. I curve I exhibits the sharp increase in temperature (hereinafter known as type I behavior) characteristic of (inter alia) barium titanate and polymers having very high crystallinity, curve II shows the more gradual increase at lower temperatures (relative to the polymer melting point) hereinafter known as type II behavior characteristic of most medium to high crystallinity polymers. Curve III (Type III behavior) exhibits the curve concave upward characteristic of many very low crystallinity polymers while curve IV (Type IV behavior) illustrates the large increase in resistance without any region of more or less constant resistance (at least in the range of commercial interest) seen with some materials. Curve V (Type V behavior) illustrates the gently increasing resistance temperature characteristic shown by many prior art electrical resistors. Although the above types of behavior have been illustrated by reference to specific types of material it will be realized by those skilled in the art that the type of behavior is also very significantly influenced by the type and amount of conductive filler present and, particularly in the case of carbon black filler, its particle size, surface characteristics, tendency to agglomerate and the shape of the particles or particle agglomerates (i.e. its tendency to structure).

It should be noted that although the prior art references teach only compositions purportedly manifesting Type I behavior, we have found that such prior art compositions in fact usually manifest Type II to Type IV behavior, which alternative Types are unrecognized by the prior art. Additionally, even those prior art materials which do have a distinct anomaly point, i.e., undergo a sharp increase in resistance at $T_s$ encounter a fall-off, i.e., decrease in resistance if the temperature of the PTC element increases significantly above $T_s$ which can occur, particularly when high power densities are present in the element.

Kohler, U.S. Pat. No. 3,243,753 discloses carbon filled polyethylene wherein the conductive carbon particles are in substantial contact with one another. Kohler contemplates a product containing 40% polyethylene and 60% carbon particles so as to give a resistance at room temperature of about 1 ohm/in. As is typical of the alleged performance of the prior art materials, Kohler's PTC product is purportedly characterized by a relatively flat curve of electrical resistance versus temperature below the switching temperature followed by a sharp rise in resistivity of at least 250% over a 25° F. range (i.e., Type I behavior). The mechanism suggested by Kohler for the sharp rise in resistivity is that such change is a function of the difference in thermal expansion of the materials, i.e. polyethylene and particulate carbon. It is suggested that the composition's high level (i.e. 60%) of conductive filler forms a conductive network through the polyethylene polymer matrix, thereby giving an initial constant resistivity at lower temperatures. However, at about its crystalline melt point, the polyethylene matrix rapidly expands, such expansion causing a breakup of many of the conductive networks, which in turn results in a sharp increase in the resistance of the composition.

Other theories proposed to account for the PTC phenomenon in conductive particle filled polymer compositions include complex mechanisms based upon electron tunnelling through inter grain gaps between particles of conductive filler or some mechanism based upon a phase change from crystalline to amorphous regions in the polymer matrix. A background dicussion of a number of proposed alternative mechanisms for the PTC phenomenon is found in "Glass Transition Temperatures as a Guide to the Selection of Polymers Suitable for PTC Materials", J. Meyer, *Polymer Engineering and Science,* November 1973, Vol. 13, No. 6.

Of significance is the fact that the PTC polymeric materials of the prior art contemplate compositions which exhibit a $T_S$ at or below the melting point of a thermoplastic component.

As mentioned above, Kohler, discloses a polyethylene or polypropylene-carbon black polymeric matrix, in which the polyolefin has been polymerized in situ, such materials exhibiting PTC characteristics at the melting temperature of the polymers. Likewise, Kohler discloses carbon particles dispersed in polyethylene in which the composition may be crosslinked, or may contain a thermosetting resin to add strength or rigidity to the system. However, the $T_S$ temperature still remains at about the crystalline melting point of the thermoplastic polyethylene, i.e., 120° C.

U.S. Pat. No. 3,825,217 to Kampe discloses a wide range of crystalline polymers which exhibit PTC characteristics. These include polyolefins such as low, medium, and high density polyethylenes and polypropylene, polybutene-1, poly(dodecamethylene pyromellitimide), ethylenepropylene copolymers, etc. It is also suggested that blends of crystalline polymers such as, a polyethylene with an ethylene-ethyl acrylate copolymer may be employed for the purpose of varying the physical properties of the final product. Also disclosed by Kampe is a process of thermal cycling above and below the melting temperature of the polymers to achieve a lower level of resistance. Similarly, Kawashima et al, U.S. Pat. No. 3,591,526 discloses polymer blends containing carbon black exhibiting PTC characteristics. However, again the thermoplastic material dictates the $T_S$ temperature, such temperature occurring at about its crystalline melting point, while the second material is functioning merely as a carrier for the carbon black loaded thermoplastic.

Finally, commonly assigned U.S. Pat. No. 3,793,716 to Smith-Johannsen discloses conductive particle-polymer blends exhibiting PTC characteristics in which a crystalline polymer having dispersed therein carbon black is dissolved in a suitable solvent above the polymer melting point which solvent is then evaporated to afford a composition manifesting a decrease in room temperature resistivity for a given level of conductive filler. Again the $T_S$ temperature is at or below the melting point of the polymer matrix, and the process of heating the polymer above the melting temperature is directed at decreasing resistance and/or maintaining constant resistance at ambient temperatures.

Current self-regulating thermal devices utilizing a PTC material contemplate, as above indicated, but do not in fact provide extremely steep (Type I) R=f (T) curves so that above a certain temperature the device will effectively shut off, while below that temperature a relatively constant wattage output at constant voltage is achieved. At temperatures below $T_S$ the resistance is at a relatively low and constant level and thus the current flow is relatively high for any given applied voltage (I=E/R). The power generated by this current flow is dissipated as Joule heat, i.e. heat generated by electrical resistance=$I^2R$, thereby warming up the PTC material. The resistance stays at this relatively low level until about the $T_S$ temperature, at which point a rapid increase in resistance occurs. With the increase in resistance there is a concomitant decrease in power, thereby limiting the amount of heat generated so that when the $T_S$ temperature is reached heating is essentially stopped. Then, upon a lowering of the temperature of the device below the $T_S$ temperature by dissipation of heat to the surroundings, the resistance drops thereby increasing the power output. At a steady state, the heat generated will balance the heat dissipated. Thus, when an applied voltage is directed across a Type I PTC heating element, the Joule heat causes heating of the PTC element up to about its $T_S$ (the rapidity of such heating depending on the type of PTC element), after which little additional temperature rise will occur due to the increase in resistance. Because of the resistance rise, such a PTC heating element will ordinarily reach a steady state at approximately $T_S$ thereby self-regulating the heat output of the element without resort to fuses or thermostats. The advantages of such a self contained heat regulating element in many applications should be apparent, in that the need for expensive and/or bulky heat control devices such as thermostats is eliminated.

Obviously, from the preceeding discussion, those skilled in the art consider materials manifesting Type I behavior to have significant advantages over PTC materials showing other types of behavior. Types II and III have a major disadvantage in that because of the much less sharp transition the steady temperature of the heater is very dependent on the thermal load placed on it. Such materials also suffer from a current inrush problem as described in greater detail hereinafter. Type IV PTC materials, because they lack a temperature range in which the power output is not markedly dependent on temperature have so far not been considered as suitable materials for practical heaters.

Although, as hereinabove mentioned, the prior art recognizes the considerable advantage of having a heater composition which possesses a resistance-temperature characteristic of Type I, many of the allegedly Type I compositions alluded to in the prior art in fact show behavior more closely resembling Type II, or even Type III behavior. The optimum (Type I) behavior is shown by only a limited selection of compositions and there has been a long felt need for a means of modifying compositions showing Type II or III behavior which on the basis of physical or other characteristics would be useful for PTC heating elements so that their behavior more closely approaches Type I. Furthermore, as heretofore indicated, many prior art materials although showing a more or less sharp inflection at $T_s$ can be caused to "turn on" again at temperatures slightly above $T_s$. That is, if the increase in resistance above $T_s$ is not great enough and/or if resistance drops above the compositions melting point (as is generally the case with prior art materials) then thermal runaway and burn-out can occur.

Polymeric PTC compositions have also been suggested for heat shrinkable articles. For example, Day in U.S. Patent Office Defensive Publication T905,001 teaches the use of a PTC heat shrinkable plastic film. However, the Day shrinkable film suffers from the rather serious shortcoming that since $T_s$ is below the crystalline melting point of the film, very little recovery force can be generated. Neither Day nor any of the other previously discussed prior art teachings even address themselves to, much less solve, certain additional problems inherent in all prior art PTC heaters. First, is the problem of current inrush. This problem is particularly severe when it is desired to provide a heater having a $T_S$ in excess of about 100° C. While it is feasible to find a polymeric PTC material having a $T_S$ as high as 150° C., the resistance of such material at or just below the $T_S$ may be as much as 10 times its resistance at ambient temperature. Since the PTC heater ordinarily functions at or slightly below its $T_S$, its effective heat output is determined by its resistance at slightly below $T_S$. Therefore, a PTC heater drawing, for example 50 amps at 150° C. could easily draw 500 amps at ambient temperatures.

When one desires to use a heat recoverable material comprising a PTC heater further deficiencies of compositions exhibiting current inrush appear. It is advantageous for heat recoverable articles to shrink as rapidly as possible. Obviously a heater having a flat power/temperature characteristic will heat up more rapidly and uniformly than a heater having, for example, a power output which is one tenth of its ambient temperature value at just below its $T_S$. We have found that selection of polymers of high crystallinity as the matrix for the conductive particles minimizes this aforesaid current inrush problem. Furthermore, such high crystallinity polymers exhibit a steep increase in resistance (i.e. have a $T_S$) about 15° C. below their crystalline melting point. Unfortunately, such polymers still possess considerable crystallinity at $T_S$ and thus not only show little recovery if previously converted into a heat recoverable state, but resist recovery of associated heat recoverable members which may themselves be above their recovery temperature. Obviously, if one selects heater resistances (i.e. lower resistances) such that the heater is switched off at a temperature closer to its peak resistance temperature ($T_P$), which correspond closely to the actual melting point, the aforementioned disadvantage may be avoided. However, we have found that all prior art heaters show resistances which either decrease sharply or in a very few instances stay substantially constant as the temperature of the PTC material is increased above its melting point. Another shortcoming of prior art PTC polymeric compositions is that as they are elongated (say to form a heat recoverable object) the ratio of the resistance at $T_P$ to the resistance at $T_s$ decreases dramatically. Thus an initial ratio of $10^8$ may fall to $10^5$ at 10% elongation and $10^3$ at 25% elongation. Obviously, these last factors greatly increase the potential for runaway overheating with prior art heaters when used in heat shrinkable devices.

It would therefore substantially advance the art to provide a PTC material evidencing Type I behavior and which does not suffer from severe current inrush. Surprisingly, we have found that many of the hereinabove discussed deficiencies of the prior art may be remedied by the provision of a polymeric, thermoplastic electrically conductive composition which exhibits a sharp rise in resistance just below its melting point but whose resistance continues to rise as the temperature is increased above the melting point. Heaters having this characteristic will continue to control even if their temperature rises above the melting point of the thermoplastic polymer, while prior art heaters would suffer thermal runaway and perhaps burn out under these conditions.

By provision of PTC compositions having this characteristic we are able to obtain heaters which will control at a resistance level even considerably above the resistance level at $T_s$ without substantial risk of thermal runaway and burn out. Furthermore, because the resistance continues to increase above $T_s$ and above the melting point, the heater temperature under power shows very little change under conditions which vary from low to high thermal loads. Thus heaters made from the compositions of the present invention reach their operating range in about the same period of time irrespective of the thermal environment within wide limits and are very "demand insensitive". This insensitivity of the heater temperature to the thermal load enables the manufacturer of heat shrinkable devices to design products which have a high degree of art insensitivity and which will not damage the substrate, such as a thermoplastic cable jacket, onto which the device is recovered.

Thus there exists a long felt need for a heater composition which overcomes the hereinabove enumerated deficiencies of the prior art.

It is thus an object of this invention to provide polymer compositions suitable for PTC heaters whose resistance changes very little below the $T_s$.

It is a further object of this invention to provide PTC polymer compositions having a $T_s$ above 100° C.

It is a further object of this invention to provide PTC polymer compositions which manifest a continued increase in resistance above the melting point of said composition.

It is another object of this invention to provide polymer compositions suitable for use as heaters in heat recoverable devices.

SUMMARY OF THE INVENTION

The aforementioned and other objects are accomplished by providing a polymeric composition comprising a first polymeric material which exhibits elastomeric properties at ambient temperatures and a second polymeric material which is a thermoplastic, the composition having dispersed therein conductive particles both said polymeric materials being cross-linked. The composition exhibits marked PTC characteristics at the melting point of the thermoplastic while exhibiting further increases in resistance at temperatures above the melting point of the thermoplastic ingredient.

DETAILED DESCRIPTION OF THE INVENTION

Figure 1:
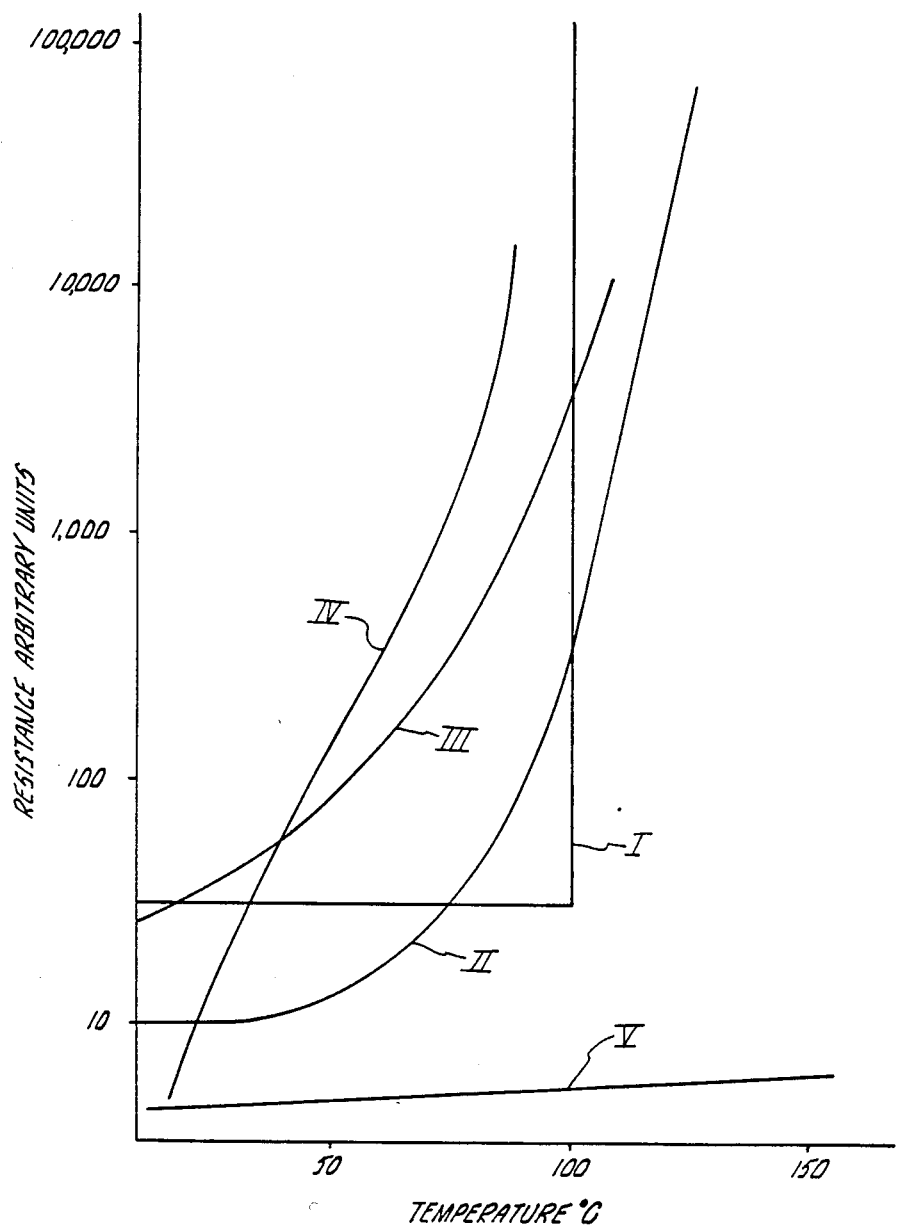
FIG. 1 has already been discussed above.

Although suitable compositions in accordance with this invention should be apparent from the examples, the following general description of materials in accordance with this invention will facilitate consideration thereof.

The compositions of this invention encompass both physical mixtures of thermoplastics and certain elastomers and also certain block and graft copolymers, as hereinafter described in greater detail, which contain thermoplastic and elastomeric segments. The combination of particular elastomeric materials with thermoplastic materials, in combination with a conductive filler such as cerbon black, will provide a PTC composition which will exhibit substantial PTC characteristics above the melting temperature of the thermoplastic.

Prior to curing (cross-linking) elastomers are generally referred to as gum-stocks. If mixtures of most gum stocks and a thermoplastic are equilibrated (heated for a time sufficient to achieve a preferred molecular configuration and orientation with respect to each other at that temperature) and then cooled, on cooling the mixture will equilibrate rapidly to a different lower temperature molecular configuration. However, some gum stocks, whether because of very high molecular weight (which cause entanglements), small regions of crystallinity, or other characteristics such as rigid or glassy portions of the molecules, after being equilibrated to a high temperature favored configuration, change from this configuration, whether neat or in admixture with a thermoplastic, only very slowly or not at all when cooled to room temperature. This phenomenon, which is well recognized by those skilled in the art, is often called "green strength". This term is also understood in the art to mean that the gum stock at room temperature possesses form stability such that articles prepared from such materials do not distort and flow to any significant extent even though uncrosslinked. Such gum stocks (uncured elastomers), for example, show a significant resistance to creep and a reluctance to coalesce when in contact in a granular form when compared with uncured elastomers which do not possess green strength. We have found that suitable elastomers for the compositions of the present invention may all be characterized as possessing significant green strength in the uncrosslinked (gum stock) state and we believe that this characteristic enables us to crosslink the composition so as to "lock in" the desired configuration which leads to the observed PTC behavior which unexpectedly continues in a temperature range where a completely amorphous mixture of polymers exist, i.e., above the melting point of any component.

In this specification, the term elastomer connotes a polymeric material which exhibits elastic deformation under stress, flexibility and resilience and is capable of recovering from large strains. The term thermoplastic connotes a polymeric material which is incapable of recovering to a substantial degree from large strains at room temperature, while at higher temperatures, above its melting point, it is capable of being reformed into any desired new shape. The term melting point connotes the temperature above which a specific material becomes elastomeric if crosslinked, or a viscous fluid if uncrosslinked and is intended to include the softening point of non-crystalline materials.

The term gum stock connotes an uncrosslinked material, which after crosslinking, exhibits elastomeric properties. The term "significant green strength" when applied to either a gum stock or thermoplastic elastomer connotes that the material has significant resistance to creep and a reluctance to coalesce when brought into contact with itself and exhibits a tensile stress of at least 10 p.s.i. at 20% elongation.

A large number of thermoplastic materials may appropriately be used in the practice of this invention.

Thus, the thermoplastic material may be selected from the following exemplary non-limiting classes of materials:
 (i) Polyolefins such as polyethylene or polypropylene.
 (ii) Thermoplastic copolymers of olefins such as ethylene and propylene, with each other and with other monomers such as vinyl esters, acids or esters of $\alpha,\beta$-unsaturated organic acids.
 (iii) Halogenated vinyl or vinylidene polymers such as those derived from vinyl chloride, vinylidene chloride, vinyl fluoride, vinylidene fluoride and copolymers thereof with each other or with other halogenated or other unsaturated monomers.
 (iv) Polyesters both aliphatic and partially or wholly aromatic such as poly(hexamethylene adipate) or sebacate, poly(ethylene terphthalate) and poly(tetramethylene terephalate).
 (v) Polyamides such as Nylon-6, Nylon-6 6, Nylon-6 10 and the "Versamids" (a condensation product of dimerized and trimerized unsaturated fatty acids, in particular linoleic acid with polyamines).
 (vi) Miscellaneous polymers such as polystrene polyacrylonitrile, thermoplastic silicone resins, thermoplastic polyethers, thermoplastic modified celluloses, and polysulphones.

As the elastomeric component, any gum stock (i.e., uncrosslinked elastomer) may be used in the practice of this invention provided that such material in the uncrosslinked state exhibits significant "green strength" as previously defined. Most commercially available gum stocks for elastomers possess either substantial green strength or little if any green strength. Therefore, those skilled in the art may readily differentiate from the list of elastomer gum stocks disclosed hereinunder, those members possessing substantial green strength. Suitable gum stocks for the elastomer component include for example:
 polyisoprene both natural and synthetic, ethylenepropylene random copolymers, polyisobutylene, styrenebutadiene random copolymer rubbers, styrene-acrylonitrilebutadiene terpolymer rubbers with and without added minor copolymerized amounts of $\alpha,\beta$-unsaturated carboxylic acids, polyacrylate rubbers, polyurethane gums, random copolymers of vinylidene fluoride and, for example, hexafluoropropylene, polychloroprene, chlorinated polyethylene, chlorosulphonated polyethylene, poly ethers, plasticized polyvinyl chloride containing more than 21% plasticizer and substantially non crystalline random co- or ter-polymers of ethylene with vinyl esters or acids and esters of $\alpha,\beta$-unsaturated acids.

Also, the elastomeric-thermoplastic combinations of this invention need not be limited to physical mixtures. Thermoplastic elastomeric copolymers are also suitable for use in the instant invention, wherein the thermoplastic and elastomeric moieties reside in different regions of the same molecule. These thermoplastic elastomeric copolymers include both graft and block copolymers such as:
 (i) random copolymers of ethylene and propylene grafted with polyethylene or polypropylene side chains.
 (ii) Block copolymers of $\alpha$ olefins such as polyethylene or polypropylene with ethylene/propylene or ethylene/propylene/diene rubbers. polystyrene with polybutadiene, polystyrene with polyisoprene, polystyrene with ethylene-propylene rubber, poly vinylcyclohexane with ethylene-propylene rubber,
 poly $\alpha$-methylstyrene with polysiloxanes, poly-carbonates with polysiloxanes, poly(tetramethylene terephthalate) with poly(tetramethylene oxide) and thermoplastic polyurethane rubbers.

A suitable composition can comprise a mixture containing from about 3.0 up to about 75.0 wt % of elastomer based on the combined weight of elastomer plus thermoplastic. A preferred amount of elastomer will range from about 4 to 40 wt %. For block copolymers possessing both thermoplastic and elastomeric regions the elastomeric region will preferably comprise from 30 to 70 wt % of the polymer molecule. The preparation of these block and graft copolymers or the admixing of the thermoplastic and elastomer can be effected by conventional means well known to the art, such as for example, milling, Banbury blending, etc. Suitable amounts of particulate conductive filler can range from 4 to 60%; 5 to 50% being preferred.

In general, any type of conductive particulate material may be used to render these compositions conductive. Preferred conductive fillers for the polymeric PTC composition useful in the present invention in addition to particulate carbon include graphite, metal powders, conductive metal salts and oxides and boron or phosphorous doped silicon or germanium.

One preferred composition according to the present invention comprises polypropylene, an ethylene-propylene rubber and carbon black particularly where the polypropylene is 5–40% of the composition, the ethylene-propylene rubber is from 40–90% of the composition and the carbon black is from 5–35% of the composition.

Those skilled in the art will understand that any suitable crosslinking method may be used to effect crosslinking of the admixture of the thermoplastic and the gum stock (or the block copolymer), provided that both polymer phases are crosslinked thereby. Suitable methods include chemical crosslinking agents such as peroxides and ionizing radiation. The preferred method of crosslinking is by the use of ionizing radiation.

SPECIFIC EXAMPLES

Unless otherwise noted, all samples for the examples below were prepared in the following manner, with the amounts given in percentages by weight.

The polymeric constituents were blended on an electrically heated two-roll mill at 200° C. for five minutes, after which carbon black was added and the mixture then blended for an additional five minutes.

The blended compositions were pressed at 200° C. to slabs approximately 0.025 inch thick. Specimens were cut from the slab, 1×1½ inch and conductive paint was applied in two ¼" wide strips along opposing edges on both sides of the slab.

The specimens were annealed to a minimum resistance by heating to 200° C. for intervals of five minutes, and then cooled to room temperature. This thermal cycling was repeated as necessary to obtain a minimum resistance. Generally, a total annealing time of 15 minutes at 200° C. was found to be adequate. For a more detailed description of annealing to minimize resistance, see Kampe U.S. Pat. No. 3,823,217, assigned to the same assignee as the present invention.

The specimens were crosslinked by irradiation at a dose of 12 megarads. Resistance vs. temperature curves were plotted by measuring the resistance across the specimen with an ohm meter which utilizes small applied voltages of less than 1 volt, thus avoiding self-heating of the specimens. The specimens were heated via an air circulating oven with resistance measured at selected temperatures.

EXAMPLE 1

TPR-2000 (a graft copolymer of ethylenepropylene rubber and approximately 20% polypropylene from Uniroyal Corp.): 70

Vulcan XC-72 (carbon black from Cabot Corp.): 30

Figure 2:
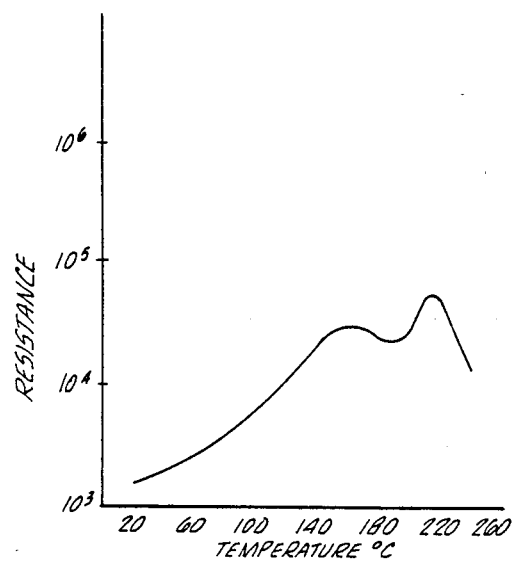
FIGS. 2 to 14 are Resistance (R) vs. Temperature (T) curves for the compositions described in Examples 1 to 15.

The elastomer is believed to be grafted with a substantially crystalline polypropylene. From FIG. 2 it can be seen that the material exhibits a steady rise in resistance from ambient to the melt temperature of polypropylene, (165° C.) after which it exhibits substantially constant resistance or a slight decrease in resistance to a higher temperature where the resistance commences to rise again.

EXAMPLE 2

Kraton G 6521 (an ABA type block copolymer of polystyrene and ethylene-propylene rubber from Shell Chemical Corp.): 75

XC-72 (carbon black): 25

Figure 3:
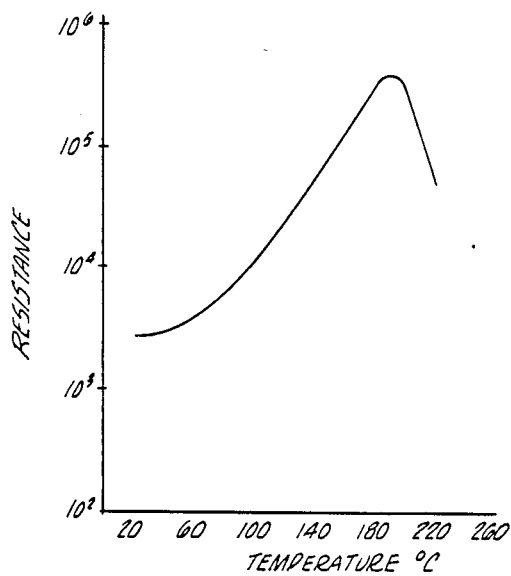
Figure 4:
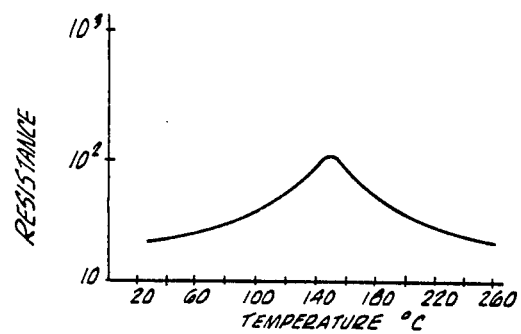

Referring to FIG. 3, it can be seen that the substantially amorphous polystyrene-ethylene-propylene rubber block copolymer exhibits a relatively sharp rise in resistance commencing just below the Tg of polystyrene which resistance continues to rise above the Tg to a peak value at 200° C. This is in sharp contrast with the teachings of the prior art, as for example J. Meyer "Glass Transition Temperature as a Guide to Polymers Suitable for PTC Materials", supra; wherein it was believed that substantially amorphous materials, such as polystyrene or ethylene propylene rubber only exhibit PTC characteristics up to their Tg.

EXAMPLE 3

Vistalon 404 (ethylene-propylene rubber: E/P ratio of 45:55 from Exxon Chemical Corp.): 65

XC-72 (carbon black): 35

An ethylene-propylene rubber having an ethylene to propylene ratio of 45 to 55 was found to exhibit no PTC characteristics. More specifically, the specimen exhibited relatively high resistances at ambient temperature notwithstanding a number of thermal cycles. The material then exhibited a continuous and rapid decrease in resistance upon heating making it unsuited for self-regulating heating applications.

EXAMPLE 4

TPR-1900 (believed to be an EPR-polypropylene graft copolymer): 60

Profax 6523 (polypropylene): 20

Vulcan XC-72 (carbon black): 20

Figure 5:
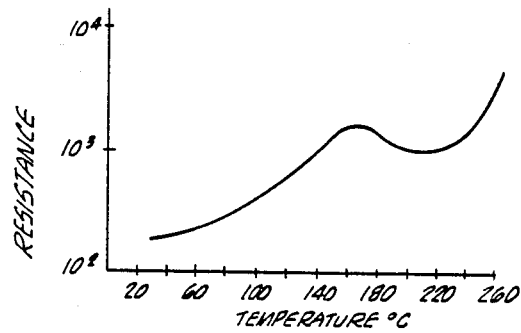

The EPR-polypropylene graft copolymer was blended with polypropylene after which it was milled with carbon black as given in the general procedure. As can be seen from FIG. 5, a relatively uniform increase in resistance occurs up to the melting point, after which a small decrease in resistance occurs. However, the material then exhibits a pronounced PTC well above the melting point.

EXAMPLE 5

Kynar 304 (Polyvinylidine Fluoride from Penn Walt Corporation): 25

Cyanocril R (Polyethyl acrylate from American Cyanamide): 50

Vulcan XC 72: 25

An elastomer in accordance with this invention was blended with the thermoplastic polyvinylidine fluoride and carbon black and irradiated to 12 Mrad. The resistance increased with increasing temperature to a temperature substantially above the melting point of polyvinylidine fluoride. In the absence of the elastomer, blends of this thermoplastic with carbon black show a resistance peak at about 160° C. and at higher temperatures show a pronounced drop in resistance.

EXAMPLE 6

TPR 1900 (believed to be an EPR-polypropylene graft copolymer): 62.5
Vulcan XC-72 (carbon black): 17.5
Profax 6523 (polypropylene): 20

This composition varies only slightly from Example 4. However, unlike the previous examples in which the polymers were first blended together via the general procedure, and thereafter the carbon black was milled into the polymer blend, in this case the carbon black was first blended with the graft copolymer and thereafter the polypropylene was blended into the mixture.

Figure 6:
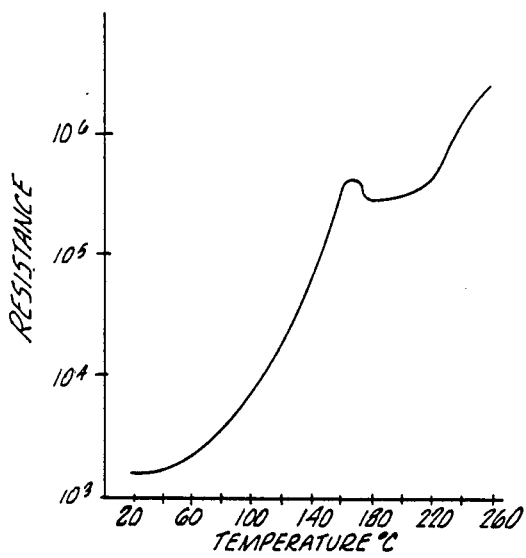

It was generally believed, in view of the prior art, that a mixture of polymeric materials would exhibit R vs. T characteristics of the polymer in most intimate contact with the carbon black, i.e., the polymer with which the carbon black was first blended and any polymer blended thereafter would not be in such intimate contact with the conductive particles as to substantially affect the R vs. T curve. Thus, from the prior art, it would be expected that the composition and blending sequence of this Example would exhibit the R vs. T curve of the graft copolymer. However, as can be seen by comparing FIG. 6 and FIG. 5, the polypropylene appears to have a substantial effect on the R vs. T characteristics of the blend.

EXAMPLE 7

CPE 3614 (chlorinated polyethylene, containing 36% Cl; from Dow Chemical Corp.): 35
Profax 6823 (polypropylene from Hercules Corp.): 35
Vulcan XC-72 (carbon black): 30

Figure 7:
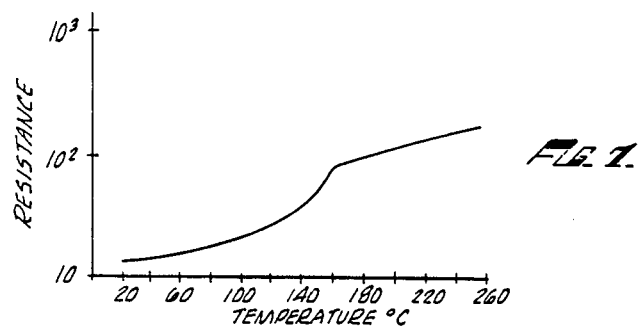

A chlorinated polyethylene elastomeric material, exhibiting significant green strength was blended with a rigid thermoplastic, crystalline polypropylene. The blend exhibits a steadily rising resistance above the melting temperature of the polypropylene as shown in FIG. 7 in accordance with the discovery of this invention. Thus, where the elastomeric portion of the composition is sufficiently structured by itself to exhibit green strength on the order of that described hereinbefore, physical blending with the thermoplastic portion of the composition, as opposed to grafting or block copolymerizing is acceptable to achieve increasing resistance characteristics above the melting temperature of the thermoplastic component.

EXAMPLE 8

CPE 3614 (chlorinated polyethylene) elastomer: 35
Kynar 451 (polyvinylidene fluoride from Pennwalt Corp.): 35
Vulcan XC-72 (carbon black): 30

Figure 8:
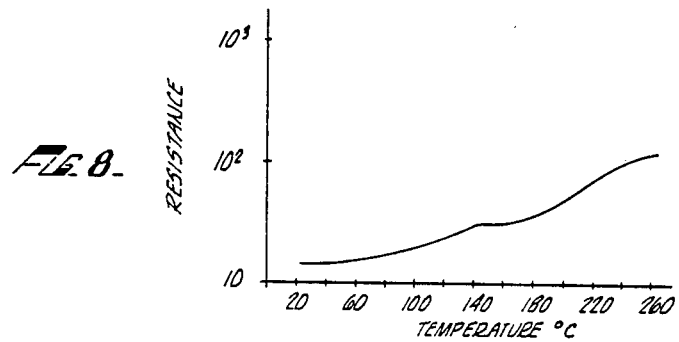

In a similar experiment to Example 7, the elastomer, having significant green strength, was blended with a substantially rigid, crystalline thermoplastic. The resultant composition exhibited a continuous rise in resistance from ambient all the way through the melt temperature of the crystalline material until the termination of measurement at 260° C. as illustrated in FIG. 8.

EXAMPLE 9

CPE 3614 (chlorinated polyethylene) elastomer: 35
Diamond PVC-35 (polyvinyl chloride from Diamond Shamrock Chem. Co.): 32
XC-72 (carbon black): 30
Stabilizers: 3

Figure 9:
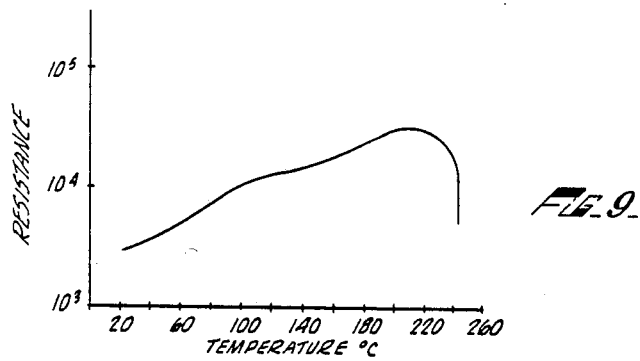

An elastomeric material, exhibiting significant green strength was mixed with an amorphous thermoplastic (PVC). As can be seen from FIG. 9, the composition exhibited PTC characteristics from ambient temperature to 220° C., and specifically in the range above the Tq of PVC (=80° C.). The decrease in resistance in this and certain other samples at temperatures well in excess of 200° C. is probably related to thermal or oxidative degradation.

EXAMPLE 10

Hypalon 45 (chlorsulfonated polyethylene from DuPont Corp.) elastomer: 35
Profax 6823 (polypropylene): 35
XC-72 (carbon black): 30

Figure 10:
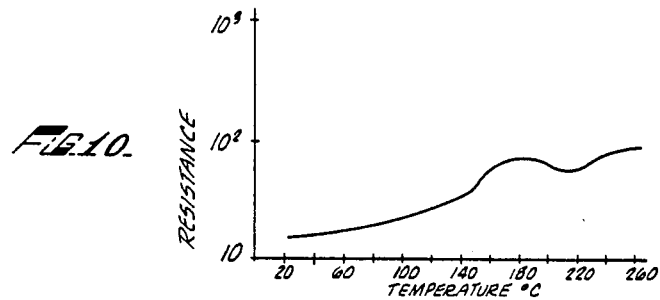

A chlorsulfonated polyethylene elastomer exhibiting significant green strength as defined hereinbefore, was physically blended with a crystalline thermoplastic (polypropylene). The mixture exhibiting initially a decrease followed by an increase in resistance above the melting temperature of the polypropylene, as seen in FIG. 10.

EXAMPLE 11

Neoprene WRT (chloroprene, DuPont Corp.): 35
Profax 6823 (polypropylene): 35
XC-72 (carbon black): 30

Figure 11:
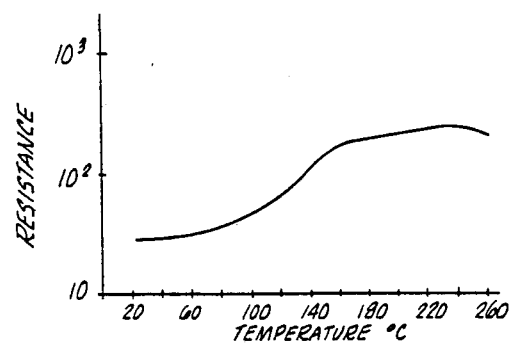

An elastomeric neoprene exhibiting high green strength was physically blended with polypropylene, such blend continuing to exhibit PTC characteristics above the melting temperature of the polypropylene as can be seen from FIG. 11.

EXAMPLE 12

Valox 310 (polytetramethyleneterephthalate, from General Electric Corp.): 42.5
Hytrel 4055 (block copolymer of polytetramethyleneterephthalate and polytetramethyleneoxide, from DuPont Corp.): 42.5
XC-72 (carbon black): 15.0

Figure 12:
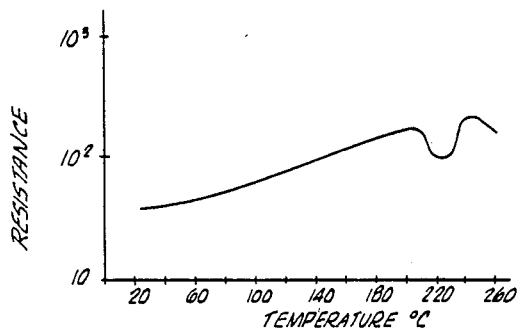

Poly-tetramethyleneterephthalate exhibiting a crystallinity of greater than 50%, was blended with a block copolymer of the crystalline thermoplastic and non-crystalline polytetramethyleneoxide elastomeric moieties. The material exhibited a resistance peak at the melt temperature of the crystalline material, i.e., 180° C., and thereafter exhibited a rise in resistance in the amorphous region as shown in FIG. 12.

EXAMPLE 13

Hypalon 45 (chlorosulphonated polyethylene): 35
Kynar 451 (polyvinylidene fluoride): 35
XC-72 (carbon black): 30

Figure 13:
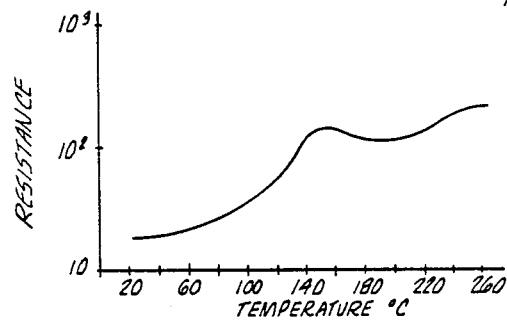

As can be seen from FIG. 13, a blend of the elastomeric Hypolon 45 with the substantially rigid and crystalline thermoplastic Kynar exhibited a rise in resistance up to the melting point of the polyvinylidene fluoride after which the resistance remains constant until a temperature well above the melt temperature of the composition and then increases steadily.

EXAMPLE 14

Silastic 437 (Silicone rubber from Dow Corning Co.): 60
Profax 6523 (polypropylene): 24
Vulcan XC-72 (carbon black): 16

Figure 14:
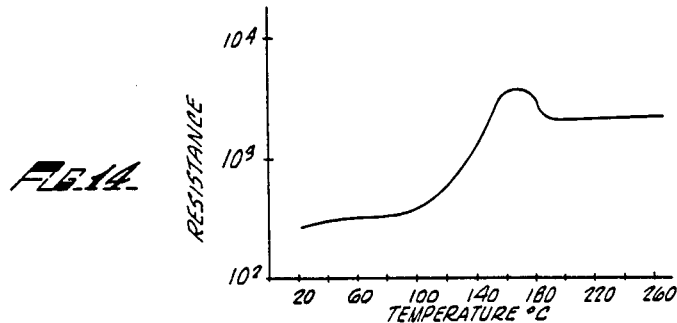

The composition described above is an example of the blending of a thermoplastic with an elastomer which does not have sufficient green strength to produce a product exhibiting PTC characteristics above the melt temperatures of the polypropylene when physically blended as seen in FIG. 14. A similar blend of 45.7 parts Marlex 6003 (a 0.96 density polyethylene supplied by Phillips Petroleum Corp.) and Silastic 437, 26.3 parts with SRF-NS 28 parts (a carbon black from Cabot Corp.) exhibited a pronounced negative temperature coefficient of resistance above the melting point of the thermoplastic as did a similar irradiated composition containing Marlex 6003 and carbon black only. Thus these compositions, which are not in accordance with the instant invention, or which represent the teachings of the prior art, do not display the advantageous properties of said invention.

EXAMPLE 15

Kynar 451: 30
Viton B 50 (an elastomeric vinylidene fluoride copolymer from DuPont de Nemous Co): 30
Vulcan XC 72: 40

The above composition, which is in accordance with the instant invention, was irradiated to 12 and 24 Mrad. The resistance started to rise rapidly below the melting point of the thermoplastic, and continued to rise with further increase in temperature.

EXAMPLE 16

A high density polyethylene was blended with various elastomers and carbon black in accordance with the instant invention as shown on Table I, and irradiated to a dose of 6 Mrads. The variation of resistance with temperature is also indicated on this Table.

TABLE 1

| Elastomer Resins | Uncured modulus at 20% elongation p.s.i. | Mixes Parts by weight (1) | (2) | (3) | Resistance behavior above melting point |
|---|---|---|---|---|---|
| Texin 480 (a polyurethane elastomer). | 300 | 58.2 | 5.8 | 36 | PTC |
| Roylar E9 (a polyurethane) | 300 | 58.2 | 5.8 | 36 | PTC |
| Roylar Ed 65 (a polyurethane) | 300 | 50 | 5 | 45 | Marked PTC |
| Royalene 502 (an ethylene-propylene rubber modified with ethylidene norbornene) | 21 | 52.7 | 5.3 | 42 | Marked PTC |
| Elvax 250 (an ethylene-vinyl acetate (28%) copolymer) | 50 | 56.4 | 5.6 | 38 | Marked PTC |
| Neoprene WRT (polychlorophene) | 10 | 56.4 | 5.6 | 38 | Slight PTC |
|  |  | 40 | 15 | 45 | Marked PTC |
| Nysin 35-8 (a copolymer of butadiene and 28% acrylonitrile) | 22 | 40 | 15 | 45 | Marked PTC |
| Epsin 5508 (an ethylene-propylene rubber modified with ethylidene norbornene) | 30 | 52.7 | 5.3 | 42 | Marked PTC |
|  |  | 40 | 23 | 37 | PTC |
| CPE 3614 (chlorinated polyethylene, containing 36% Cl) | 83 | 56.4 | 5.6 | 38 | Marked PTC |
|  |  | 40 | 23 | 37 | PTC |

*Notes on Table
columns 1, 2, and 3 give the parts by weight of Marlex 6002 (polyethylene) elastomer and carbon black (SRF/WS) respectively.

Examples 3 and 14 represent compositions not in accordance with the present invention. The other examples are in accordance with the present invention.

What is claimed:

1. An electrically conductive crosslinked polymeric composition which (a) is suitable for use in a self-regulating heating article comprising at least two electrodes positioned so that that, when the electrodes are connected to a power source, current passes through the composition, (b) has a positive temperature coefficient of resistance and (c) comprises (1) a first polymeric material which prior to cross-linking exhibits significant green strength corresponding to a tensile stress of at least 10 p.s.i. at 20% elongation and which exhibits elastomeric properties at ambient temperatures in the crosslinked state (2) a second thermoplastic polymeric material, and (3) conductive particles which have been dispersed in said polymeric material such that the composition exhibits increased resistance with increased temperatures at temperatures substantially above the melting point of either material.

2. The composition of claim 1 wherein the conductive particles are carbon black.

3. The composition of claim 1 wherein the elastomeric and thermoplastic materials are separate segments contained in a graft or block copolymer.

4. The composition of claim 1 wherein the elastomeric and thermoplastic materials comprise a physical blend of polymers.

5. The composition of claim 3 wherein the polymer is a graft copolymer.

6. The composition of claim 3 wherein the polymer is a block copolymer.

7. The composition of claim 5 wherein the elastomeric moiety is an ethylene-propylene rubber and the thermoplastic moiety is a crystalline polyolefin.

8. The composition of claim 6 wherein the elastomeric moiety is an ethylenepropylene rubber and the thermoplastic moiety is a polystyrene.

9. The composition of claim 6 wherein the elastomeric moiety is a polytetramethylene oxide and the thermoplastic moiety is a polytetramethylene terephthalate.

10. The composition of claim 4, wherein the elastomeric material is selected from the group consisting of chlorinated polyethylene, chlorosulfonated polyethylene and neoprene.

11. The composition of claim 4 comprising an ethylene-propylene rubber, polypropylene and carbon black.

12. The composition of claim 11 wherein the polypropylene is in the range of from 5 to 40% of the composition, the ethylene-propylene rubber is from 40 to 90% and the carbon black is from 5 to 35%.

13. The composition of claim 1 wherein the amount of the elastomeric material is from about 3 to about 75% by weight of the combined weight of elastomeric material and thermoplastic material.

14. The composition of claim 13 wherein the amount of the elastomeric material is from about 4 to about 40% by weight of elastomeric material and thermoplastic material.

15. The composition of claim 1 wherein the amount of the conductive material is from 4 to 60% by weight of the composition.

16. The composition of claim 15 wherein the amount of the conductive material is 5 to 50% by weight of the composition.

17. The composition of claim 1 wherein the amount of the elastomeric material is from about 4 to 40% by weight of the combined weight of the elastomeric material and the thermoplastic material, and the amount of the conductive filler is from 5 to 50% by weight of the composition.

18. The composition of claim 6 wherein the elastomeric region provides 30–70% by weight of the copolymer.

19. The composition of claim 1 which has been crosslinked by ionizing radiation.

20. The composition of claim 1 which has been annealed to obtain minimum resistance.

* * * * *